United States Patent
Ragan

(10) Patent No.: US 10,003,246 B2
(45) Date of Patent: Jun. 19, 2018

(54) LINEAR-MOTOR STATOR WITH INTEGRAL LINE REACTOR

(71) Applicant: Laitram, L.L.C., Harahan, LA (US)

(72) Inventor: Bryant G. Ragan, Metairie, LA (US)

(73) Assignee: Laitram, L.L.C., Harahan, LA (US)

( * ) Notice: Subject to any disclaimer, the term of this patent is extended or adjusted under 35 U.S.C. 154(b) by 351 days.

(21) Appl. No.: 15/066,064

(22) Filed: Mar. 10, 2016

(65) Prior Publication Data

US 2017/0264182 A1 Sep. 14, 2017

(51) Int. Cl.
| | |
|---|---|
| *H02K 41/02* | (2006.01) |
| *H02K 1/16* | (2006.01) |
| *H02K 3/48* | (2006.01) |
| *H02K 19/10* | (2006.01) |
| *H02K 17/12* | (2006.01) |
| *H02K 1/17* | (2006.01) |

(52) U.S. Cl.
CPC .............. *H02K 41/02* (2013.01); *H02K 1/16* (2013.01); *H02K 1/17* (2013.01); *H02K 3/48* (2013.01); *H02K 17/12* (2013.01); *H02K 19/10* (2013.01)

(58) Field of Classification Search
CPC ............ H02K 41/02; H02K 1/16; H02K 1/17; H02K 3/48; H02K 17/12; H02K 19/10
See application file for complete search history.

(56) References Cited

U.S. PATENT DOCUMENTS

| | | | | |
|---|---|---|---|---|
| 4,542,312 A | * | 9/1985 | Kawamura | H05B 6/34 310/13 |
| 4,781,286 A | | 11/1988 | Weaver | |
| 5,300,846 A | * | 4/1994 | Miller | H02K 41/02 310/12.02 |
| 6,789,305 B2 | * | 9/2004 | Seki | H02K 3/24 29/596 |
| 7,820,923 B1 | | 10/2010 | Daboub | |
| 9,202,719 B2 | * | 12/2015 | Lu | H02K 21/24 |
| 9,647,511 B2 | * | 5/2017 | Morel | H02K 9/22 |
| 9,685,849 B2 | * | 6/2017 | Lu | H02K 41/02 |
| 2014/0285122 A1 | * | 9/2014 | Lu | H02K 21/24 318/135 |
| 2015/0129393 A1 | | 5/2015 | Ragan | |
| 2017/0264182 A1 | * | 9/2017 | Ragan | H02K 41/02 |

FOREIGN PATENT DOCUMENTS

| | | |
|---|---|---|
| JP | 2005245108 A | 9/2005 |
| JP | 2012157183 A | 8/2012 |
| KR | 1020040003930 A | 1/2004 |

OTHER PUBLICATIONS

International Search Report and Written Opinion of the International Searching Authority, PCT/US2017/018835, dated May 22, 2017, Korean Intellectual Property Office, Republic of Korea.
*AC Line Reactors* vs. *DC Link Chokes*: SVX vs DG1 Comparison, Application Note AP042003EN, Eaton Corporation, Apr. 2014, Cleveland, Ohio.

\* cited by examiner

*Primary Examiner* — Robert W Horn

(74) *Attorney, Agent, or Firm* — James T. Cronvich

(57) ABSTRACT

A linear-motor stator assembly comprising a stator and an integral line reactor in one housing. The reactor has inductor coils which are connected in series with the stator windings to compensate for unequal inductances in the stator phases and balance the polyphase currents into the stator.

17 Claims, 2 Drawing Sheets

US 10,003,246 B2

LINEAR-MOTOR STATOR WITH INTEGRAL LINE REACTOR

BACKGROUND

The invention relates generally to polyphase linear motors and more particularly to line reactors unitarily housed with linear-motor stators.

Linear induction motors and other linear motors are often configured as polyphase motors, usually with three phases. Because of magnetic end effects and winding layouts, the inductances of the stator windings typically differ from phase to phase. The stator phases should be excited by currents nearly equal in magnitude so that an optimal traveling magnetic flux wave is generated. The current imbalance in stators resulting from unequal phase inductances is solved in two main ways. One solution is to drive the stator coils with a current-regulated amplifier, but current-regulated drives are expensive. Another way stator inductances are balanced is with inductive reactors. Inductor coils in the reactors are connected in series with the stator windings to balance the net inductances of the phases so that the stator can be driven by a more common variable-frequency drive (VFD). Because the reactors are separate units external to the stators, they must be packaged with and electrically connected to the stator. The packaging and the cabling can be difficult in harsh environments, such as those requiring NEMA 4X or IP67 washdown ratings.

SUMMARY

One version of a linear-motor stator assembly embodying features of the invention comprises a stator and a reactor. The stator includes a stator core portion having a first end and an opposite second end defining the length of the stator core portion and an outer face having a plurality of pole faces separated by a plurality of stator coil slots opening onto the outer face between the first and second ends. A plurality of sets of stator coils reside in the stator coil slots and are connected to form polyphase stator windings propagating a magnetic flux wave along the length of the stator portion through the pole faces. The reactor includes a reactor core portion abutting the stator core portion and having an outer face with a plurality of inductor coil slots opening onto the outer face. A plurality of inductor coils reside in the inductor coil slots. Each of the inductor coils is connected electrically in series with one or another of the sets of stator coils.

Another version of such a linear-motor stator assembly comprises a core that includes a first outer face and a second outer face. The first outer face extends in length from a first end to a second end and has a plurality of pole faces separated by a plurality of stator coil slots opening onto the first outer face between the first and second ends. The second outer face has a plurality of inductor coil slots opening onto the second outer face. Three sets of stator coils reside in the stator coil slots and are connected to form three-phase stator windings propagating a magnetic flux wave through the pole faces along the length of the first outer face. A plurality of inductor coils reside in the inductor coil slots. Each of the inductor coils is connected electrically in series with one or another of the sets of stator coils.

In another aspect, a linear-motor system comprises a housing, a stator having three stator windings housed in the housing, a reactor having inductors housed in the housing adjacent to the stator, and a three-phase variable-frequency drive. The inductors are electrically connected between the three-phase variable-frequency drive and one or more of the three stator windings to balance the currents in the three stator windings.

DETAILED DESCRIPTION

Figure 1:
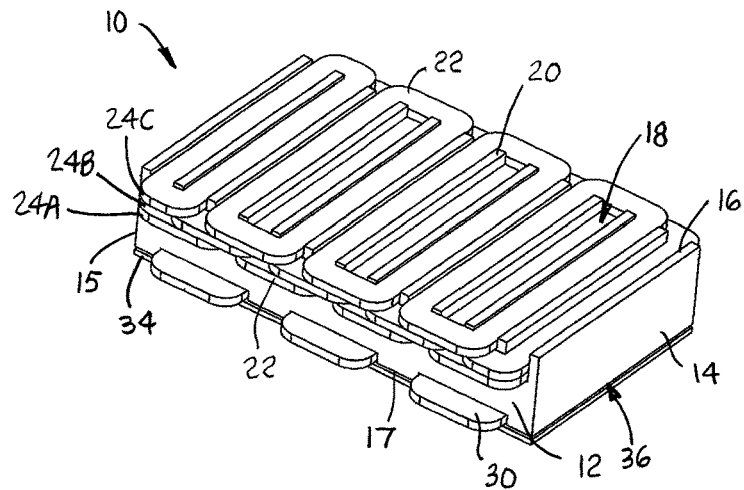
FIG. 1 is an isometric view of a linear-motor stator assembly embodying features of the invention.
Figure 2:
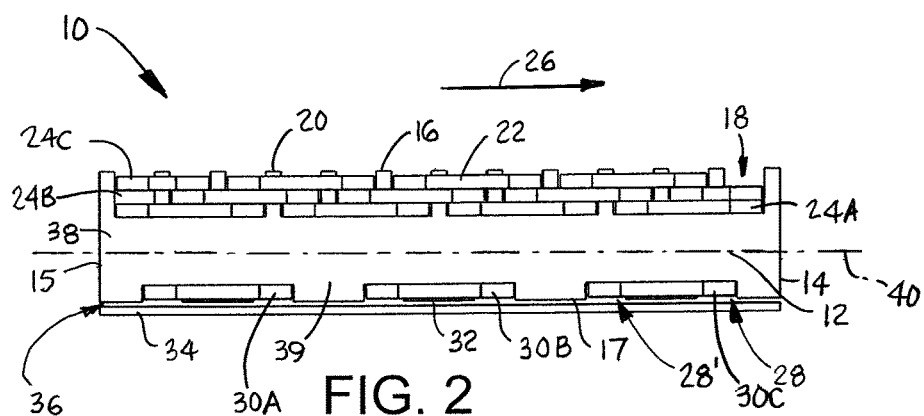
FIG. 2 is a side elevation view of the stator assembly of FIG. 1.

A stator assembly embodying features of the invention is shown in FIGS. 1 and 2 for a linear motor, such as a linear induction motor or a linear synchronous motor. The stator assembly 10 comprises a core 12 that extends in length from a first end 14 to a second end 15. The core extends in thickness from an upper obverse outer face 16 to a lower reverse outer face 17. Slots 18 open onto the upper outer face 16 between the first and second ends 14, 15 and divide the upper outer face into pole faces 20 between consecutive slots. Stator coils 22 reside in the stator slots 18. In this example the stator coils 22 are arranged in three layers: a bottom layer 24A, a middle layer 24B, and a top layer 24C. Some of the slots have coils in each layer; others have coils in only two of the layers. The stator coils 22 are arranged in three sets. The coils in each set are connected electrically in series to form one winding of a three-phase stator. For example, all the stator coils 22 in the bottom layer 24A could be wired in series to form the U-phase winding. The coils 22 in the middle layer 24B could be wired in series to form the V-phase winding. And the coils 22 in the top layer 24C could be wired in series to form the W-phase winding. When the three stator windings are connected to three-phase power, the stator propagates a magnetic flux wave through the pole faces 20 in its upper outer face 18 in a propagation direction 26 along the length of the stator.

Pairs of slots 28, 28' open onto the bottom outer face 17 of the core 12 to receive inductor coils 30A-C—three, in this example. There are more stator coil slots 18 than inductor coil slots 28, 28'. A core piece 32 between each pair of inductor coil slots 28, 28' extends through the center of each inductor coil and forms a high permeability core for the coil. A steel plate 34 separated from the inductors' core pieces 32 and the bottom outer face 17 of the core 12 by a gap 36 serves as a magnetic shunt completing the inductors' magnetic circuits. The plate 34 can also serve as a mounting plate for the stator assembly 10. When electrically connected to the stator coils 22, the inductor coils 30A-C can compensate for differences in the reactances of the stator coils. Thus, the induction coils are equivalent to line reactors.

In FIGS. 1 and 2 the inductor coils 30A-C and the stator coils 22 share the same core 12. But the core 22 is thicker between the top and bottom faces 16, 17 than if the stator did not include the integral inductor coils 30A-C. The thicker core 22 helps decouple the stator flux from the inductor flux. So the core 12 is separated into a stator core portion 38 and a reactor core portion 39 by an imaginary plane 40 between the top and bottom faces 16, 17. The core 12 is constructed of transformer-steel laminations to reduce eddy currents, but could be a solid piece of metal. Appropriate sizing of the pole faces 20 and the depths of the slots 18, 28, 28' can result in the use of the same coil forms for both the stator coils 22 and the inductor coils 30A-C of the reactor.

Figure 3:
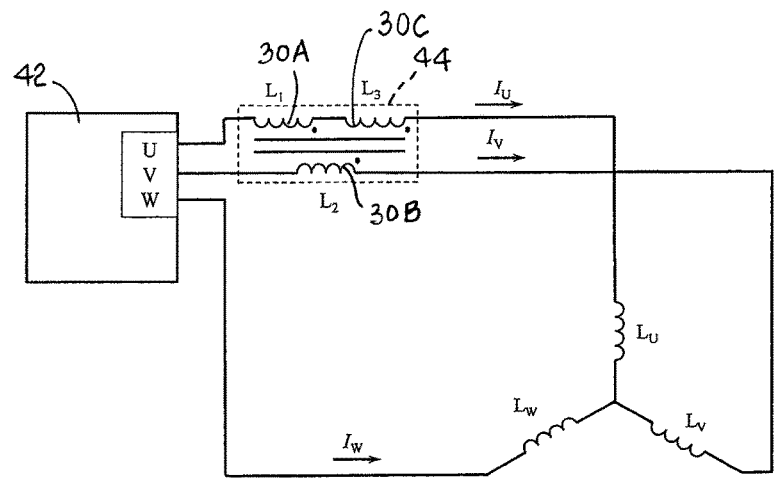
FIG. 3 is an electrical schematic diagram of the stator assembly of FIG. 1.

The electrical wiring of the stator portion of a linear-motor system with the reactor inductors connected between the stator windings and a VFD is shown schematically in FIG. 3. The three-phase output lines U, V, W of the VFD 42 are connected to the three stator windings, whose inductances are $L_u$, $L_v$, and $L_w$. In general the three inductances will not be equal. To compensate for imbalanced currents in the stator windings due to the effect of unequal winding inductances $L_U$, $L_V$, $L_W$ on the VFD 42, a line reactor 44 composed of the inductor coils 30A-C is used. In this example, $L_U < L_V < L_W$. Without compensation the currents $I_U$, $I_V$, $I_W$ in the stator windings are unbalanced because of the effect of the different inductances $L_U$, $L_V$, $L_W$ in each phase on the voltage-source VFD. Because $L_U$ is the lowest inductance, two inductor coils 30A and 30C are connected electrically in series between the VFD 42 and the U-phase winding. So the inductance seen by the VFD in phase U is $L_U+L_1+L_3$. The remaining inductor coil 30B is connected in series with the stator's V-phase winding to increase the inductance seen by the VFD 42 to $L_V+L_2$. No inductance is added to the highest-inductance W-phase winding. In that way the total inductances in the phases are more nearly equal and the resulting phase currents $I_U$, $I_V$, $I_W$ better balanced for a more effective magnetic flux wave.

Figure 4:
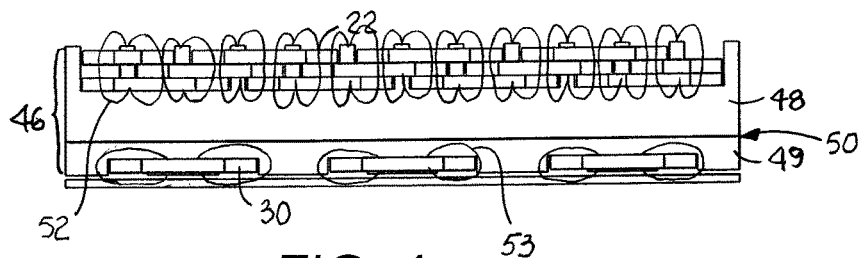
FIG. 4 is a side elevation view of another version of a linear-motor stator assembly as in FIG. 1, but with isolated stator and reactor cores.

FIG. 4 shows another version of the core. In this version the core 46 comprises, rather than a monolithic core as in FIGS. 1 and 2, two separate core pieces: a stator core portion 48 and a reactor core portion 49. The two portions 48, 49 are shown to have the same length and are encapsulated together to form an integral structure. The two separate pieces 48, 49 are separated back to back by a small gap 50 that helps magnetically isolate the flux return paths 52 of the stator coils 22 from the flux return paths 53 of the inductor coils 30.

Figure 5:
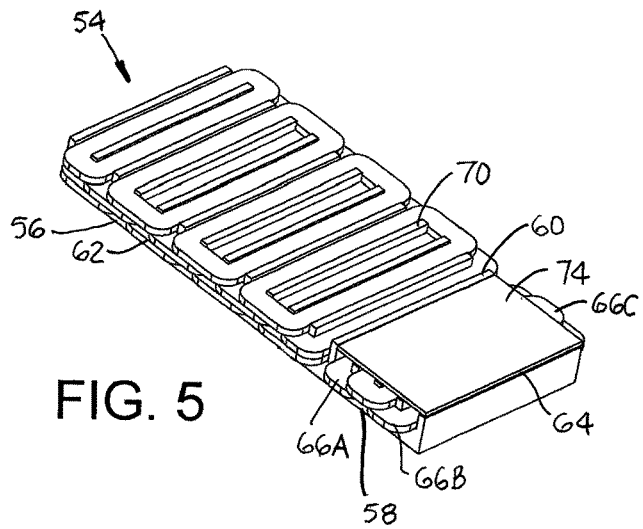
FIG. 5 is an isometric view of a third version of a linear-motor stator assembly with an integral reactor side-by-side with a stator.
Figure 6:
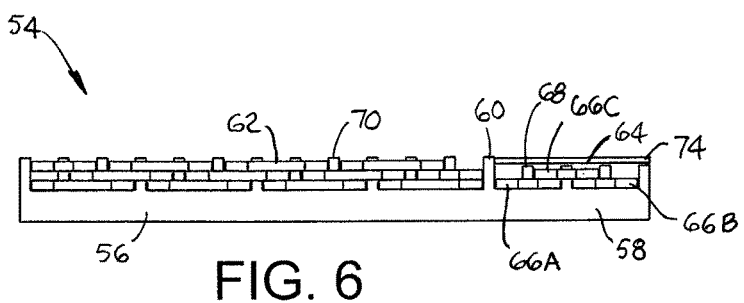
FIG. 6 is a side elevation view of the linear-motor stator assembly of FIG. 5.

Instead of the back-to-back configuration of the stator assemblies of FIGS. 1 and 4, the stator-assembly 54 in FIGS. 5 and 6 is configured with a stator core portion 56 abutting a reactor core portion 58 at an end 60 of the stator core portion. A single solid core or laminated core profile could be used to form a stator 62 integral with a reactor 64. The reactor 64 in FIG. 6 has three inductor coils 66A-C and three pole faces 68 facing upward in the same direction as stator pole faces 70. A magnetic-shunt plate 74 facing the reactor pole faces 68 completes the inductors' magnetic circuits.

Figure 7:
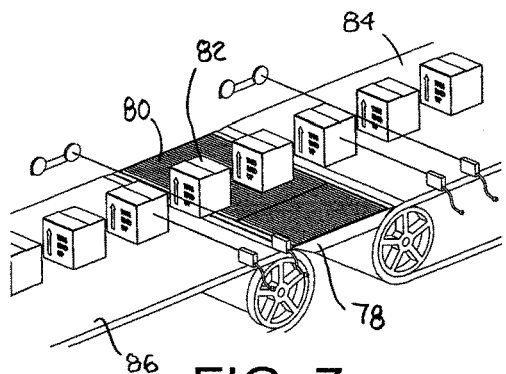
FIG. 7 is an isometric view of a roller transfer plate using a linear-motor stator assembly as in FIG. 1, FIG. 4, or FIG. 5 to rotate the rollers.

FIG. 7 shows an exemplary application for a linear-motor stator assembly as in any of FIGS. 1-6. A stator assembly with integral reactors resides in a housing 78 beneath an array of electrically conductive or magnetic rollers 80 arranged in parallel across a small gap from the stator pole faces. For electrically conductive rollers, the stator's magnetic flux wave induces currents in the rollers 80 that create magnetic fields that interact with the stator's magnetic flux wave and cause the rollers to rotate. Thus, the electrically conductive rollers 80 serve as rotors that form linear induction motors with the stator. For magnetic rollers, the stator's magnetic flux wave interacts with the magnetic fields of the permanent magnets and causes the rollers to rotate. Thus, the magnetic rollers 80 serve as rotors that form linear synchronous motors with the stator. Boxes 82 transfer across the rotating rollers 80 from an infeed conveyor belt 84 to a discharge conveyor belt 86.

The invention has been described in detail by reference to a few example versions. But other versions are possible. For example, the system could be a polyphase system of more than three phases. The use of the terms "integral" or "unitary" with respect to the stator and the reactor means that they are joined and enclosed together in a single housing. The unitary stator and reactor can share a common monolithic (solid or laminated) core or can have separate cores closely spaced from each other. One is not external to the other's housing.

What is claimed is:

1. A linear-motor stator assembly comprising:
   a stator including:
      a stator core portion having:
         a first end and an opposite second end defining the length of the stator core portion;
         an outer face having a plurality of pole faces separated by a plurality of stator coil slots opening onto the outer face between the first and second ends;
      a plurality of sets of stator coils residing in the stator coil slots and connected to form polyphase stator windings propagating a magnetic flux wave along the length of the stator portion through the pole faces;
   a reactor including:
      a reactor core portion abutting the stator core portion and having:
         an outer face having a plurality of inductor coil slots opening onto the outer face;
      a plurality of inductor coils residing in the inductor coil slots, wherein each of the inductor coils is connected electrically in series with one or another of the sets of stator coils.

2. A linear-motor stator assembly as in claim 1 wherein the stator includes three sets of stator coils connected to form three-phase stator windings and wherein the reactor includes three inductor coils and wherein one of the inductor coils is connected electrically in series with one of the three sets of stator coils and the other two of the inductor coils are connected electrically in series with each other and with another one of the sets of stator coils.

3. A linear-motor stator assembly as in claim 2 wherein the at least two inductor coils are connected electrically with the three sets of stator coils to compensate for unequal reactances in the three sets of stator coils.

4. A linear-motor stator assembly as in claim 1 further comprising a steel plate facing the outer face of the reactor core portion to provide a magnetic shunt for the reactor and to serve as a mounting plate for the linear-motor stator assembly.

5. A linear-motor assembly as in claim 1 wherein the stator core portion and the reactor core portion are complementary portions of a monolithic core whose obverse face is the outer face of the stator core portion and whose reverse face is the outer face of the reactor core portion.

6. A linear-motor stator assembly as in claim 1 wherein the stator core portion and the reactor core portion are separate cores magnetically isolated from each other and encapsulated together into a unitary structure.

7. A linear-motor stator assembly as in claim 1 wherein the reactor core portion abuts the first end of the stator core portion and the outer face of the stator core portion and the outer face of the reactor core portion face in the same direction.

8. A linear-motor stator assembly as in claim 1 wherein there are more stator coil slots than inductor coil slots.

9. A linear-motor stator assembly as in claim 1 further comprising an array of electrically conductive rollers arranged in parallel along the length of the stator core portion across a small gap to serve as rotors rotated by the magnetic flux wave and forming linear induction motors with the stator.

10. A linear-motor stator assembly as in claim 1 further comprising an array of rollers arranged in parallel along the length of the stator core portion across a small gap and including permanent magnets, wherein the rollers serve as rotors rotated by the magnetic flux wave and form linear synchronous motors with the stator.

11. A linear-motor stator assembly comprising:
a core including:
a first outer face extending in length from a first end to a second end and having a plurality of pole faces separated by a plurality of stator coil slots opening onto the first outer face between the first and second ends;
a second outer face having a plurality of inductor coil slots opening onto the second outer face;
three sets of stator coils residing in the stator coil slots and connected to form three-phase stator windings propagating a magnetic flux wave through the pole faces along the length of the first outer face;
a plurality of inductor coils residing in the inductor coil slots, wherein each of the inductor coils is connected electrically in series with one or another of the sets of stator coils.

12. A linear-motor stator as in claim 11 wherein the first outer face is an obverse face of the core and the second outer face is a reverse face of the core.

13. A linear-motor stator as in claim 11 wherein the first outer face and the second outer face face in the same direction.

14. A linear-motor stator assembly as in claim 11 further comprising a steel plate facing the second outer face to provide a magnetic shunt for the inductor coils and to serve as a mounting plate for the linear-motor stator assembly.

15. A linear-motor system comprising:
a housing;
a stator having three stator windings housed in the housing;
a reactor having inductors housed in the housing adjacent to the stator;
a three-phase variable-frequency drive;
wherein the inductors are electrically connected between the three-phase variable-frequency drive and one or more of the three stator windings to balance the currents in the three stator windings.

16. A linear-motor system as in claim 15 further comprising an array of electrically conductive rollers arranged in parallel across a small gap from the stator to serve as rotors rotated by a magnetic flux wave and forming linear induction motors with the stator.

17. A linear-motor system as in claim 15 further comprising an array of rollers arranged in parallel across a small gap from the stator and including permanent magnets, wherein the rollers serve as rotors rotated by a magnetic flux wave produced by the stator and form linear synchronous motors with the stator.

* * * * *